United States Patent
Liu et al.

(10) Patent No.: US 7,969,951 B2
(45) Date of Patent: Jun. 28, 2011

(54) POWER-SAVING WIRELESS NETWORK, PACKET TRANSMITTING METHOD FOR USE IN THE WIRELESS NETWORK AND COMPUTER READABLE MEDIA

(75) Inventors: Yung-Chih Liu, Taipei (TW);
Shih-Hung Liu, Taipei County (TW);
Ming-Jer Tsai, Hsinchu County (TW)

(73) Assignee: Institute for Information Industry, Taipei (TW)

( * ) Notice: Subject to any disclaimer, the term of this patent is extended or adjusted under 35 U.S.C. 154(b) by 1096 days.

(21) Appl. No.: 11/428,065

(22) Filed: Jun. 30, 2006

(65) Prior Publication Data

US 2007/0237122 A1    Oct. 11, 2007

(30) Foreign Application Priority Data

Apr. 10, 2006  (TW) ................ 95112717 A (51) Int. Cl.
| | |
|---|---|
| H04W 4/00 | (2009.01) |
| H04L 12/28 | (2006.01) |
| H04B 7/00 | (2006.01) |
| H04B 5/00 | (2006.01) |

(52) U.S. Cl. ............. 370/338; 370/241.1; 370/363; 370/412; 455/466; 455/41.2

(58) Field of Classification Search .......... 370/338, 370/241.1, 363, 412; 455/466, 41.2, 41.3
See application file for complete search history.

(56) References Cited

U.S. PATENT DOCUMENTS

| | | |
|---|---|---|
| 5,479,219 A | 12/1995 | Aihara |
| 5,797,094 A * | 8/1998 | Houde et al. ............ 455/412.2 |
| 6,263,212 B1 * | 7/2001 | Ross et al. ............ 455/466 |
| 6,735,448 B1 | 5/2004 | Krishnamurthy et al. |
| 6,922,788 B2 | 7/2005 | Eberhard et al. |
| 6,950,645 B1 | 9/2005 | Kammer et al. |
| 6,973,039 B2 | 12/2005 | Redi et al. |
| 6,978,149 B1 | 12/2005 | Morelli et al. |
| 6,985,755 B2 | 1/2006 | Cadieux et al. |
| 2003/0004720 A1 * | 1/2003 | Garudadri et al. ........ 704/247 |
| 2004/0171393 A1 * | 9/2004 | Harding ............... 455/466 |
| 2004/0255001 A1 * | 12/2004 | Oh et al. .............. 709/209 |
| 2005/0003794 A1 * | 1/2005 | Liu ................... 455/355 |
| 2007/0174465 A1 * | 7/2007 | Huang et al. ........... 709/227 |

* cited by examiner

*Primary Examiner* — Ariel Balaoing
(74) *Attorney, Agent, or Firm* — Patterson Thuente Christensen Pedersen, P.A.

(57) ABSTRACT

A power-saving wireless network, a packet transmitting method for use in the wireless network, and computer readable medium therefor are provided. The wireless network comprises a PAN coordinator, a receiving node and a transferring node. When the transmitting node has a packet planed to be transmitted to the receiving node which is in a sleep mode, the packet is alternatively transmitted to the PAN coordinator. As soon as the receiving node wakes from the sleep mode, all packets are transmitted to the receiving node from the PAN coordinator. After the packets are all successfully transmitted, the receiving node turns back to the sleep mode subsequently. Thereby, the performance of the wireless network would not be restricted to the sleep period and memory capacity. Thus, the nodes in the wireless network would greatly facilitate saving power.

25 Claims, 8 Drawing Sheets

POWER-SAVING WIRELESS NETWORK, PACKET TRANSMITTING METHOD FOR USE IN THE WIRELESS NETWORK AND COMPUTER READABLE MEDIA

CROSS-REFERENCES TO RELATED APPLICATIONS

This application benefits from the priority of Taiwan Patent Application No. 095112717 filed on Apr. 10, 2006.

BACKGROUND OF THE INVENTION

1. Field of the Invention

The present invention relates to a wireless network, a packet transmitting method for use in the wireless network, and a computer readable medium therefor. In particular, the invention relates to a power-saving wireless network with packets buffering performance, a packet transmitting method for use in the wireless network, and a computer readable medium therefor.

2. Descriptions of the Related Art

Low speed wireless communication devices are highly noticed recently in the fields of household appliances, toys, industries, security services, and medical care. For the characteristics of low cost, low power consumption, and easily disposed of those low speed wireless communication devices, they are especially proper to be applied in a broad service area with little maintenance. Among various low speed wireless communication protocols, the most representative standard among them is IEEE 802.15.4/ZigBee.

Figure 1:
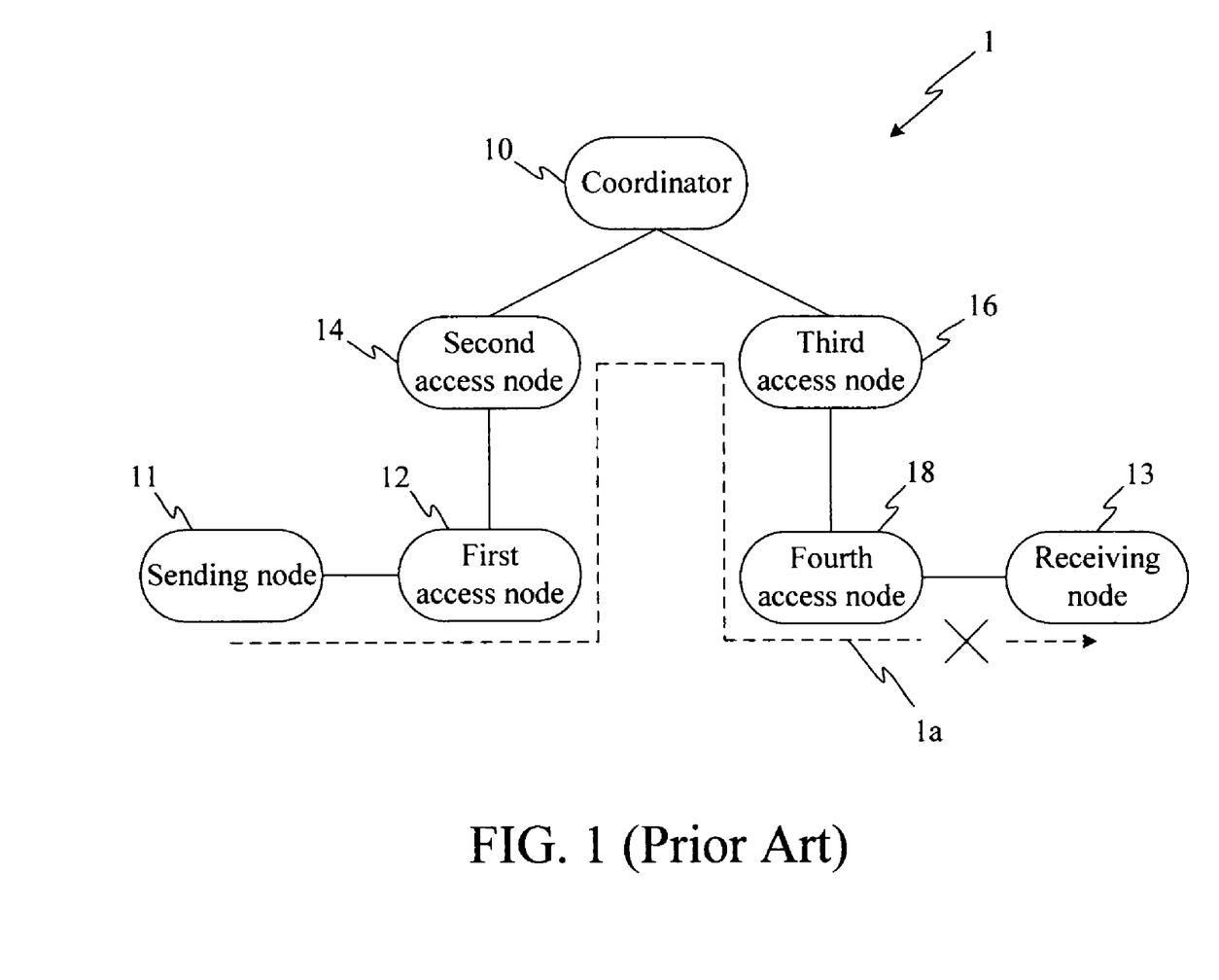
FIG. 1 is a schematic view illustrating packet transmission in a conventional wireless network.

In a ZigBee wireless network, the coverage is limited due to the restricted radio wave strength. When a large service area is desired, access points are usually needed to be disposed to form a union to provide better radio wave coverage. As shown in FIG. 1, a conventional wireless network 1 is illustrated. The wireless network 1 comprises a personal area network coordinator (PAN coordinator) 10, a sending node 11, a receiving node 13, a first access node 12, a second access node 14, a third access node 16, and a fourth access node 18. When the sending node 11 requires sending a packet to the receiving node 13, the packet has to be transmitted by the access nodes 12, 14, 16 and 18 to the receiving node 13, due to the limited radio wave coverage. A transmitting path 1a for illustrating the transmitted packet is approximately indicated in FIG. 1.

However, for the purpose of power-saving, nodes in the ZigBee wireless network frequently enter into a sleeping mode. For example, the node may shut down the wireless antenna which may be the most power consuming element thereof. Meanwhile, as shown in the transmitting path 1a, the packet would not be received by the receiving node 13 correctly, and thus, the packet would be lost. To solve the problem, generally, there are two conventional solutions. One is to temporarily store the packet in the neighbor nodes (e.g. the fourth access node 18), and the other is to shorten the sleep period of the receiving node 13.

In point of the first solution, the memory size of the access nodes would be a key factor. The memory size of the access node needs to be increased for providing sufficient space to store packets temporarily. Furthermore, when an access node corresponds to a plurality of receiving nodes, the memory size thereof would be inestimable and then the costs of constructing the wireless network would be raised. Moreover, the conventional technology uses the MAC (medium access control) layer of the packet. In accordance with the conventional ZigBee standards, it only stipulates that "at least reserving a packet" in the MAC layer. Just a few companies develop technologies which support seven-packet storage. Nevertheless, the problem of memory requirements will definitely occur in some situations and result in loss of packets and restrict the applications of the ZigBee wireless network as well.

In point of the second solution, shortening the sleep periods of the receiving node would simultaneously shorten the power-saving period of the receiving nodes. It would be a disadvantage to construct a power-saving wireless network. Furthermore, the temporary period of the packets is three seconds by present ZigBee standards. It could simply infer that the receiving nodes have to return to working mode in three seconds (e.g. waking up every two seconds). Thus, power-saving efficiency of the nodes would be greatly reduced.

Given the above, a novel power-saving wireless network, a packet transmitting method for use in the wireless network, and a computer readable medium therefor need to be developed in this field.

SUMMARY OF THE INVENTION

The primary objective of this invention is to provide a wireless network, a packet transmitting method for use in the wireless network, and a computer readable medium therefor. By temporarily storing the packets in a coordinator, waiting for a receiving node actively requesting after waking from a sleep mode, the packets are subsequently transmitted to the receiving node. It could eliminate the restrictions on the sleep mode of the receiving node.

Another objective of this invention is to provide a wireless network, a packet transmitting method for use in the wireless network, and a computer readable medium therefor. Since the packets are temporarily stored in the coordinator, the memory requirements of the nodes or routers could be greatly diminished. It would benefit for constructing a large service area. Furthermore, the coordinator generally possesses superior hardware than other devices in the network so that the whole wireless network can be constructed and operated merely depending on the performance of the coordinator but not other devices such as nodes or routers in the present invention.

A further objective of this invention is to provide a wireless network, a packet transmitting method for use in the wireless network, and a computer readable medium therefor. By the routing rules in the present invention, a power-saving wireless network would be obtained. It can extend the sleep period of the devices so as to prolong the battery life of the devices.

Yet a further objective of this invention is to provide a wireless network, a packet transmitting method for use in the wireless network, and a computer readable medium therefor. By temporarily storing the packets in the coordinator, it is no longer restricted by the present ZigBee standards including the periods of temporarily storing packets not longer than three seconds, maximum of temporarily storing packets on the nodes, etc.

To achieve the above-mentioned objectives, the power-saving wireless network of the present invention comprises a coordinator, a receiving node and a transferring node. The transferring node has a packet required to be transmitted to the receiving node. The transferring node transmits the packet to the coordinator and stores a pending flag recording the packet waiting to be received by the receiving node when the transferring node determines the receiving node being in a sleep mode. Then, the coordinator receives and stores the packet.

The present invention further comprises a packet transmitting method for use in the above-mentioned wireless network. The method comprises the steps as follows: determines by the transferring node that the receiving node is in a sleep mode; transmitting the packet to the coordinator by the transferring node; storing a pending flag in the transferring node wherein the pending flag records the packet waiting to be received by the receiving node; and receiving and storing the packet by the coordinator.

The present invention further comprises a computer-readable medium, storing a computer program to perform the above-mentioned method.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

Figure 2:
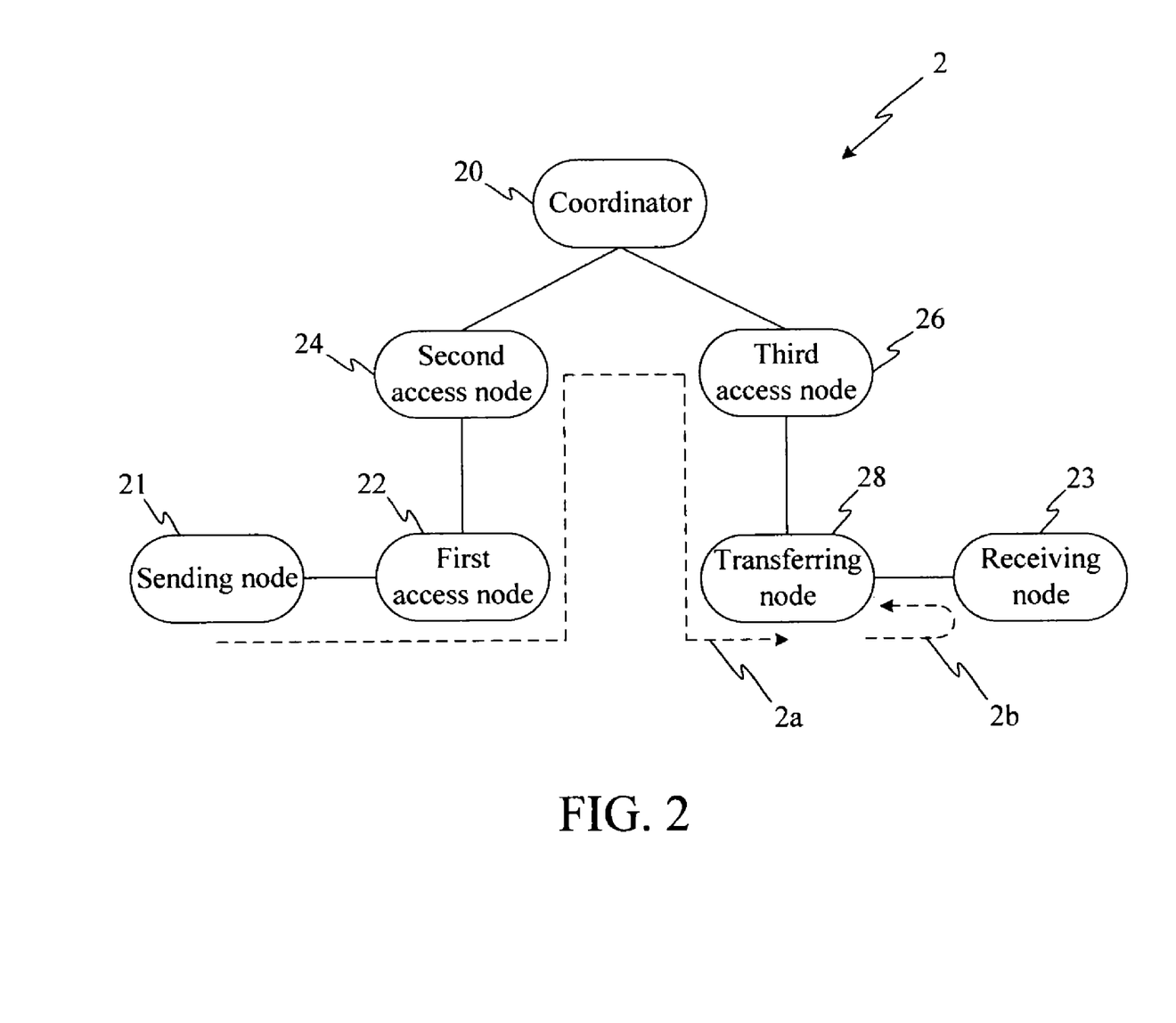
FIG. 2 is a schematic view illustrating the receiving node in a sleep mode in the wireless network of the present invention.

FIG. 2 shows a power-saving wireless network 2 as the first embodiment of the present invention. The power-saving wireless network 2 comprises a coordinator 20, a receiving node 23, and a transferring node 28. In this embodiment, the wireless network 2 further comprises a sending node 21 attempting to transmit a packet to the receiving node 23. As shown in the figure, when the radio wave of the sending node 21 cannot cover the receiving node 23, the packet would be transferred along a transmitting path 2a to the transferring node 28. Then, the transferring node 28 prepares for transmitting the packet to the receiving node 23.

Subsequently, the transferring node 28 determines whether the receiving node 23 is in a sleep mode by sending a sleep request packet. A transmitting path 2b illustrating the path of the sleep request packet is shown in FIG. 2. Please referring to FIG. 3, when the receiving node 23 is in the sleep mode, the transferring node 28 transmits and stores the packet to the coordinator 20 (e.g. a transmitting path 2c). Besides, it stores a pending flag in the transferring node 28 which records the packet waiting to be received by the receiving node 23.

Figure 4:
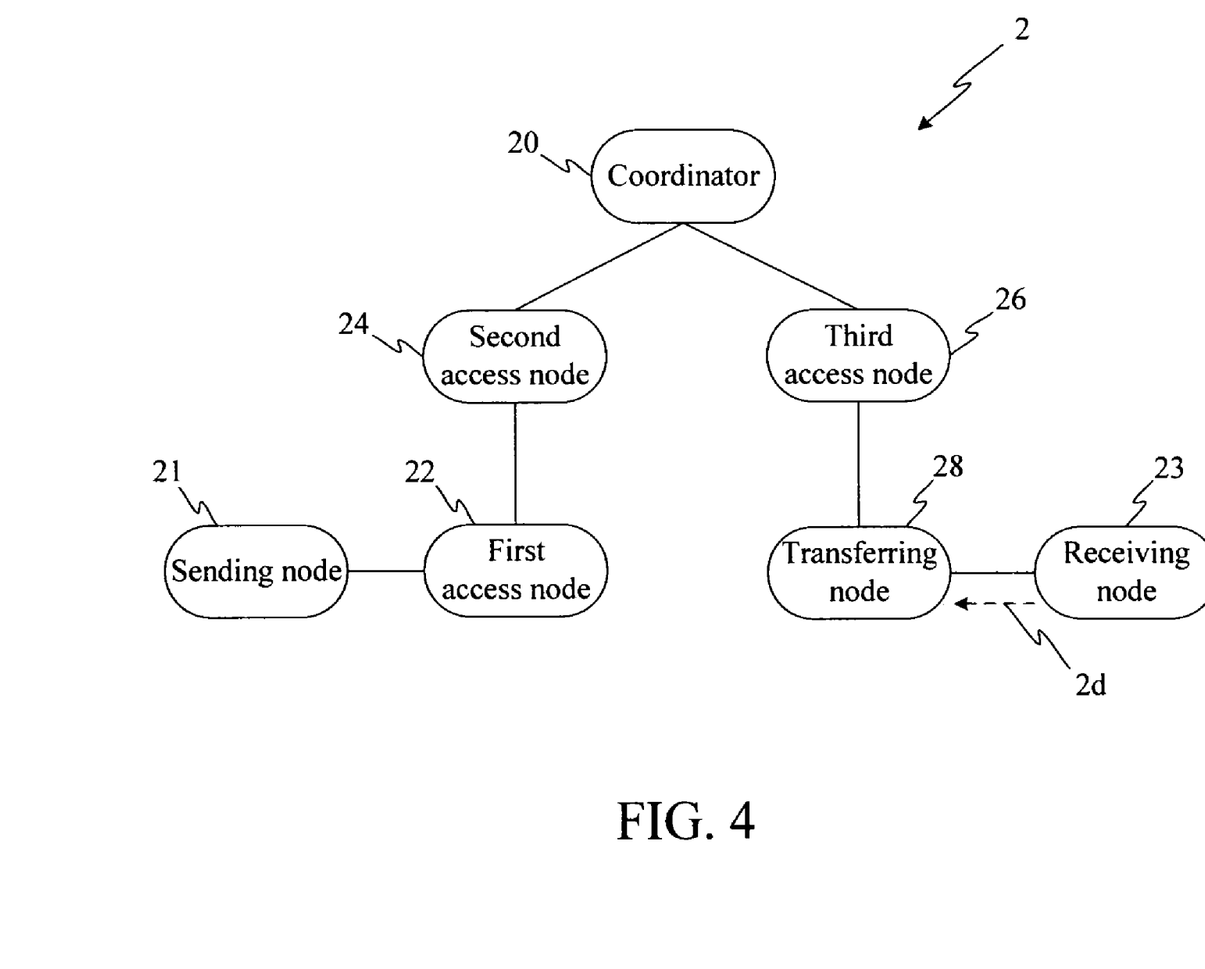
FIG. 4 is a schematic view illustrating the receiving node waking from the sleep mode in the wireless network of the present invention.

When the receiving node 23 wakes from the sleep mode to enter to a working status, it transmits a request signal to the transferring node 28. A transmitting path 2d is shown in FIG. 4. The transferring node 28 determines whether the packet exists or not by checking the pending flag corresponding to the request signal.

Figure 5:
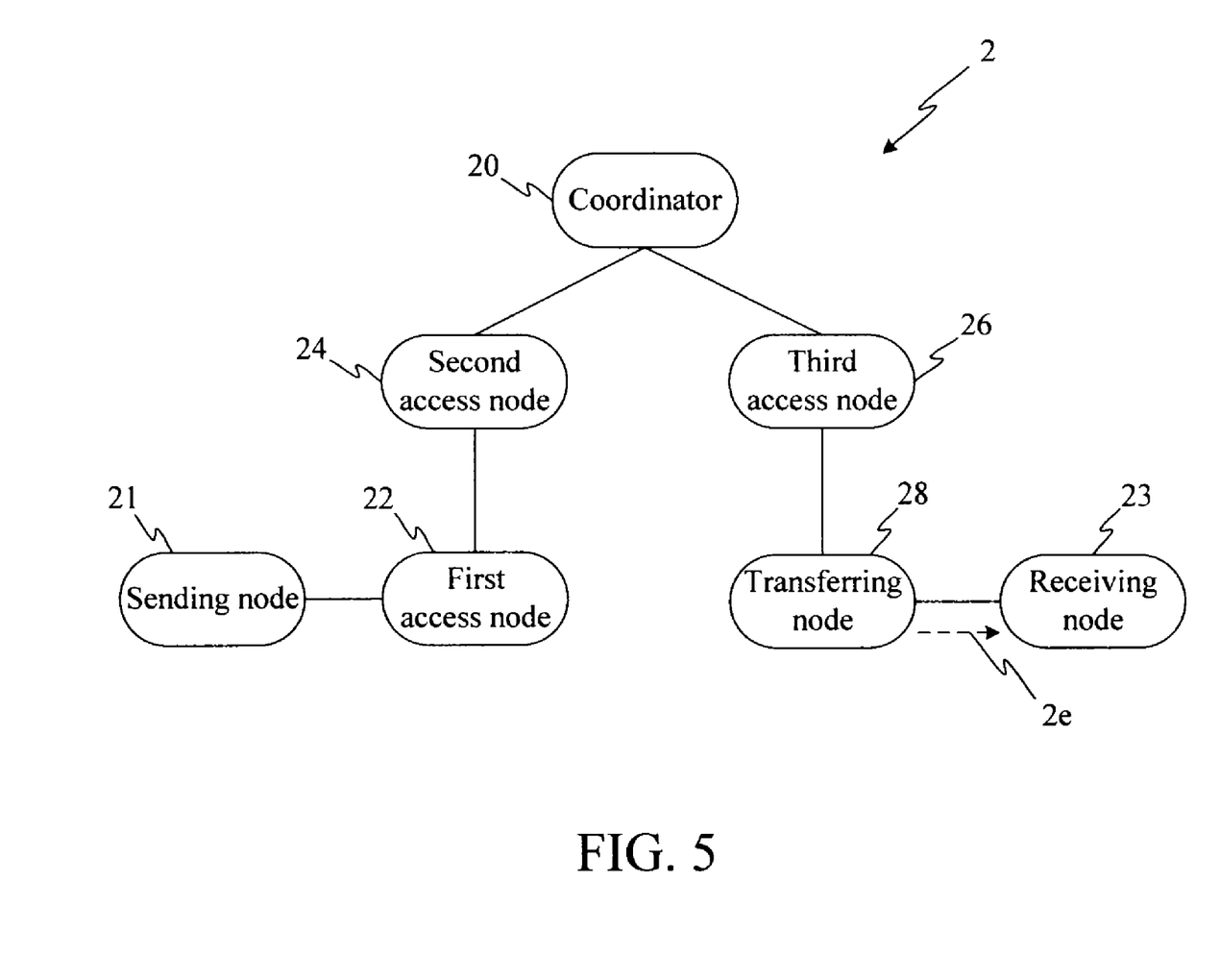
FIG. 5 is a schematic view illustrating that the receiving node has no packet waiting to be received in the wireless network of the present invention.

When the transferring node 28 determines that the packet does not exist, it will transmit an ending packet to the receiving node 23. A transmitting path 2e for transmitting the ending packet is shown in FIG. 5. Then, the receiving node 23 returns to the sleep mode when it receives the ending packet. Preferably, the ending packet is a packet with zero-length.

When the transferring node 28 determines that the packet exists, the transferring node 28 transmits a retrieving command packet to the coordinator 20. After the coordinator 20 receives the retrieving command packet, the coordinator 20 would check all packets which are corresponding to the retrieving command packet and transmit them to the receiving node 23. Subsequently, the coordinator 20 transmits an ending packet to the receiving node 23. Similarly, the receiving node 23 returns to the sleep mode corresponding to the ending packet and the ending packet is a packet with zero-length in a preferred embodiment.

Figure 7A:
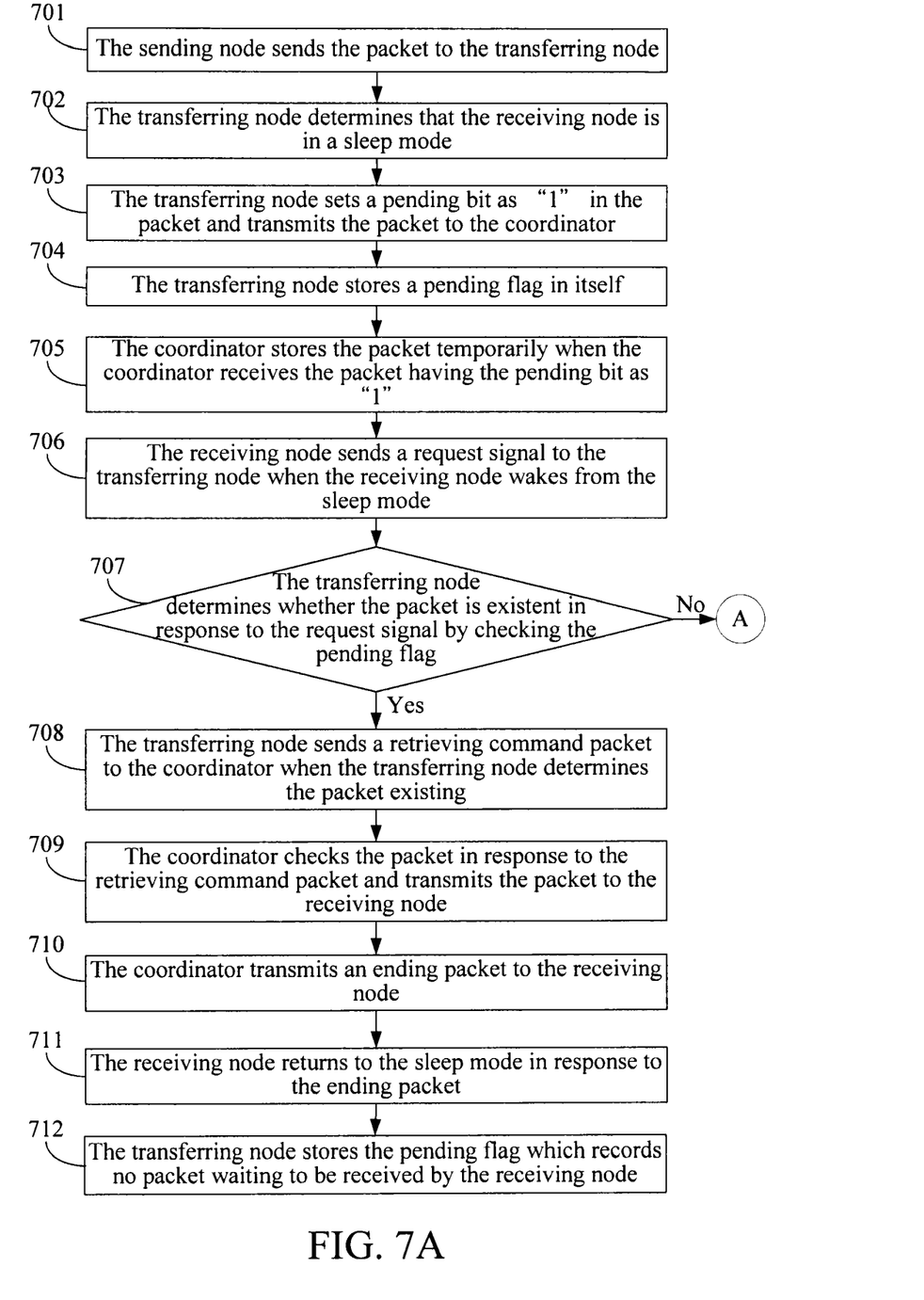
FIGS. 7A-7B are flowcharts of a second embodiment of the present invention.
Figure 7B:
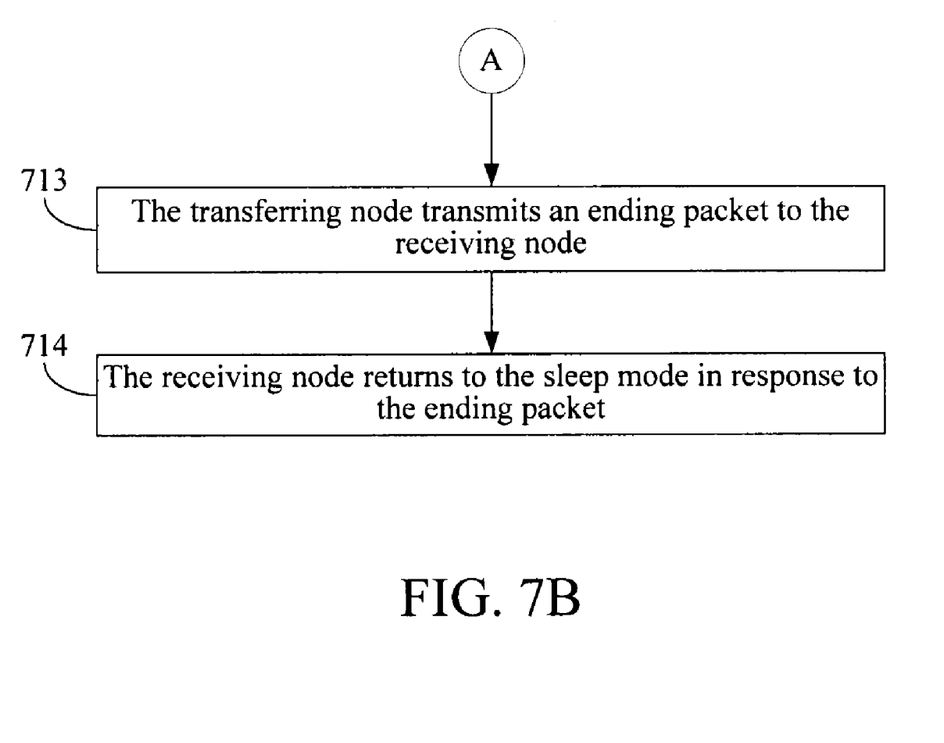

The second embodiment of the present invention is a packet transmitting method for use in a wireless network which is depicted in FIGS. 7A-7B. Preferably, the wireless network is the same with the above-mentioned of the first embodiment. The wireless network comprises the coordinator 20, the receiving node 23 and the transferring node 28 as well. The transferring node 28 has a packet required to be transmitted from the sending node 21 to the receiving node 23. The steps of this embodiment are described as follows. It is noted that the processes of transferring and transmitting in this embodiment will follow IEEE 802.15.4/Zigbee which stipulates the transmitting technology by using the network layer. Advantageously, it would not suffer from the restrictions on using the MAC layer in the prior art.

Firstly, step 701 is executed to enable the sending node 21 sends the packet, which is originally desired to be transmitted to the receiving node 23, to the transferring node 28. When the transferring node 28 has a packet to be transmitted, step 702 is executed to enable the transferring node 28 determine whether the receiving node 23 is in a sleep mode first. If the receiving node 23 is in a sleep mode and is unable to receive the packet, step 703 is executed to enable the transferring node 28 to transmit the packet to the coordinator 20 and step 704 is executed to enable the transferring node 28 to store a pending flag in itself. The pending flag records that the packet is stored and waiting to be received by the receiving node 23. Subsequently, step 705 is executed to enable the coordinator 20 to receive and store the packet.

As shown in FIG. 2, the transmitting path 2a illustrates that the packet is transmitted through a first access node 22, a second access node 24, and a third access node 26, to the transferring node 28. At least a source address, an objective address and information contents are recorded in the packet. The source address could be the network address of the sending node 21 (e.g. 0x0021) and the objective address could be the network address of the receiving node 23 (e.g. 0x0023) which are utilized to recognize the packet during transmission.

Figure 3:
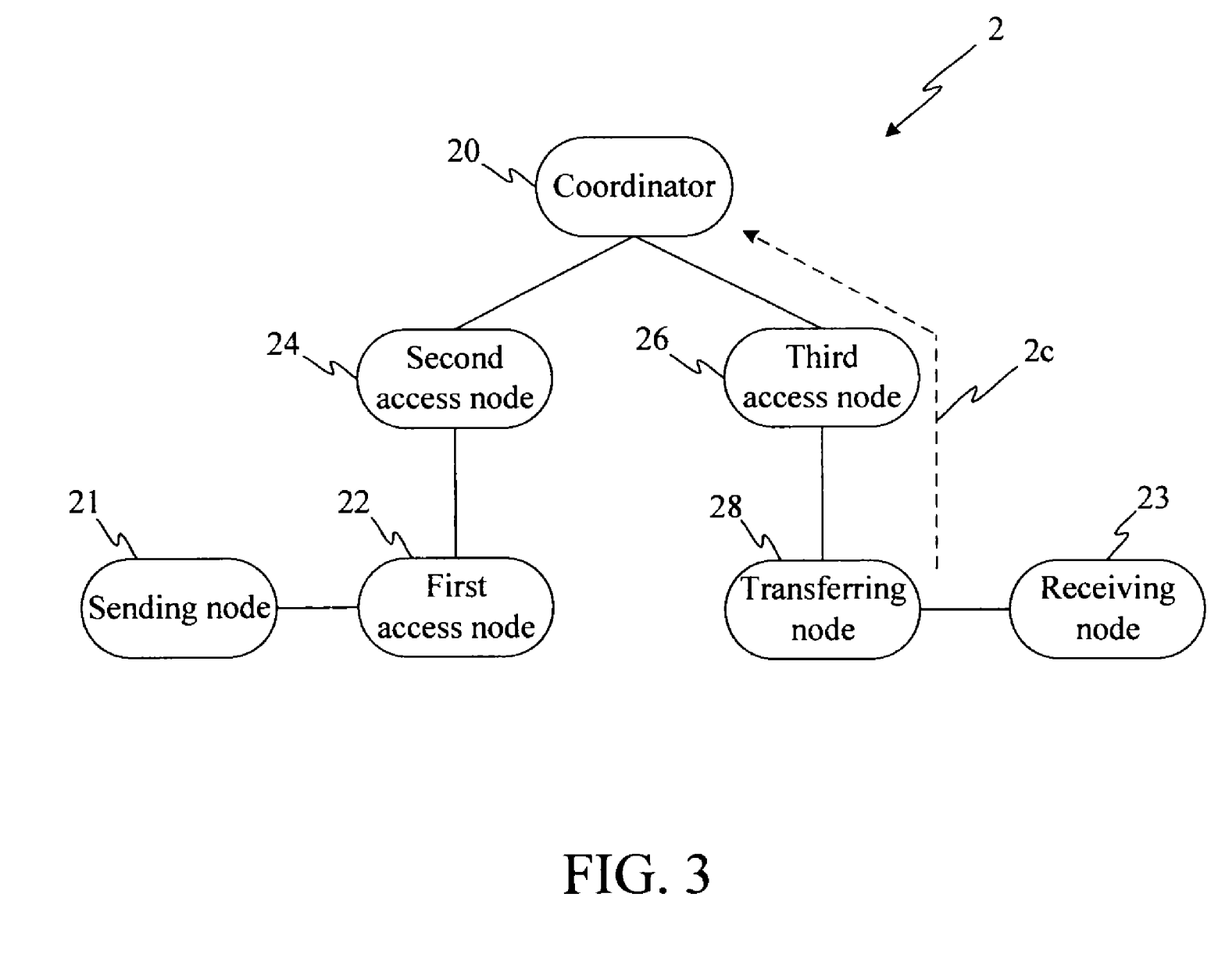
FIG. 3 is a schematic view illustrating the packet stored in the coordinator in the wireless network of the present invention.

As shown in FIG. 3, when the transferring node 28 transmits the packet to the coordinator 20, the method further comprises a step, step 703, of setting a pending bit as "1" in the packet. The pending bit could also be named as a pending-packet flag or a reserved bit. Furthermore, the pending bit is one of a plurality of bits in the packet. Then, step 705 is executed to enable the coordinator 20 to store the packet temporarily when the coordinator 20 receives the packet having the pending bit as "1".

The transmitting path 2d, shown in FIG. 4, illustrates step 706 that the receiving node 23 would send a request any packet exists and waits to be received or not. More specifically, the request signal includes the address of the receiving node 23 (e.g. 0x0023). The transferring node 28 will compare the request signal with the aforesaid pending flag. Then, step 707 is executed to enable the transferring node 28 to determine whether the packet exists or not by checking the pending flag.

Figure 6:
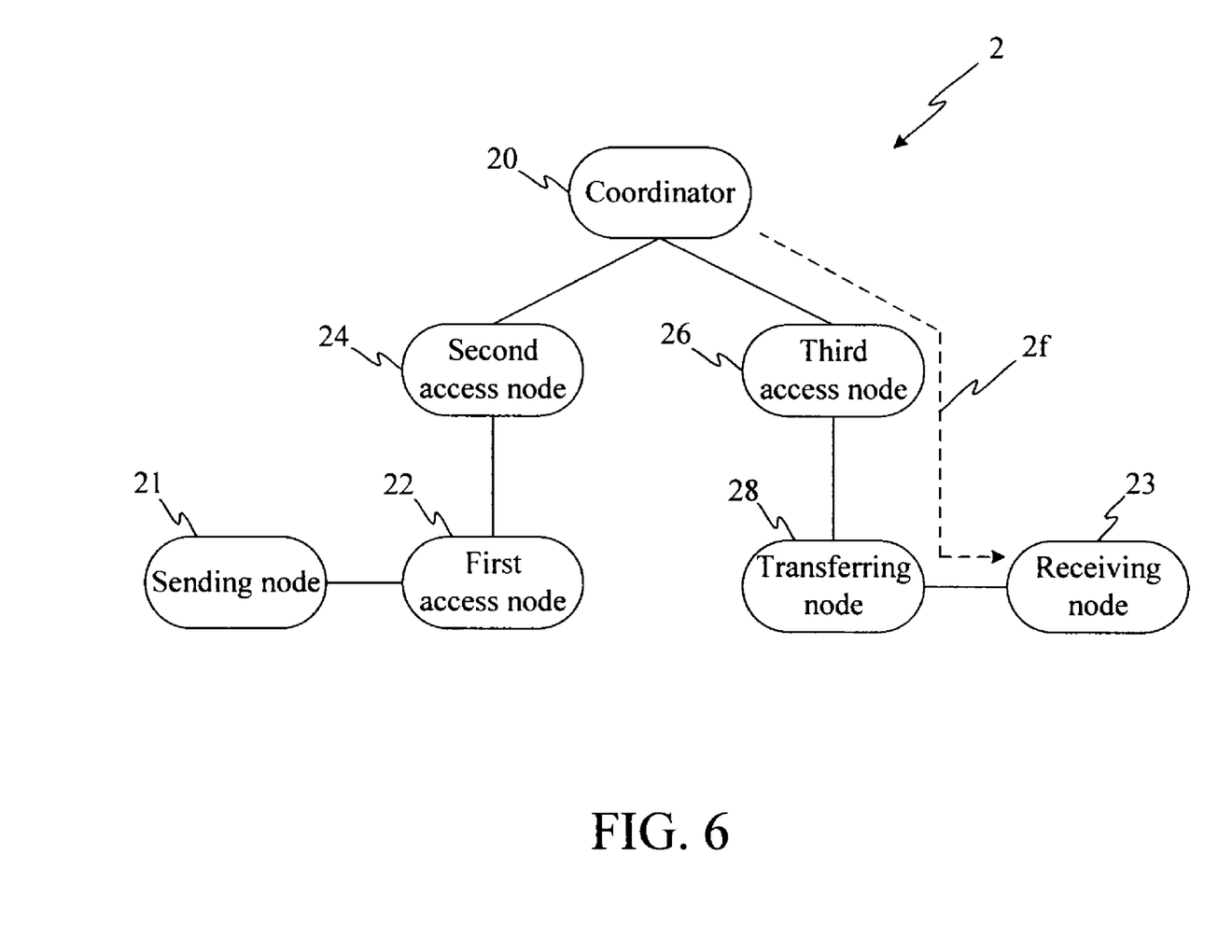
FIG. 6 is a schematic view illustrating that the receiving node has the packet waiting to be received in the wireless network of the present invention.

When the transferring node 28 determines that the packet exists, it sends a retrieving command packet to the coordinator 20. The coordinator 20 subsequently checks all packets corresponding to the retrieving command packet, and then, transmits such packets to the receiving node 23 along a transmitting path 2f as shown in FIG. 6. Preferably, the coordinator 20 transmits all packets in a manner of FIFO (first-in-first-out) transmission. More specifically, the retrieving command packet includes the address of the receiving node 23 (e.g. 0x0023) and the address of the coordinator 20 (e.g. 0x0020). Thus, the coordinator 20 may easily recognize and arrange all packets so that all packets can be subsequently transmitted.

Eventually, step 710 is executed to enable the coordinator 20 to transmit an ending packet to the receiving node 23 while the ending packet is a packet with zero-length preferably. More specifically, the ending packet merely records the address of the receiving node 23 (0x0023) and the address of the coordinator 20 (0x0020) in the head of the packet in which the data length is zero. Furthermore, the receiving node 23 determines whether all packets have been received corresponding to the ending packet, and then, step 711 is executed to enable the receiving node 23 to return to the sleep mode for reducing power consumptions. Soon after, since the packet has been transmitted from the coordinator 20 to the receiving node 23, step 712 is executed to enable the transferring node 28 to update the pending flag as "none."

In other words, if there is no packet waiting to be received by the receiving node 23 during the sleep period, the pending flag should be "none." As shown in FIG. 5, when the transferring node 28 determines that the packet does not exist, step 713 is executed to enable the transferring node 28 to transmit an ending packet to the receiving node 23 along a transmitting path 2e. Preferably, the ending packet is a packet with zero-length. Then, step 714 is executed to enable the receiving node 23 returns to the sleep mode corresponding to the ending packet.

The present invention also comprises a computer-readable medium, storing a computer program to perform said method. The computer-readable medium could be floppy disks, hard disks, CD-ROMs, portable storing devices, magnetic tapes, accessible database via network or any other storage media possessing the same functions that people skilled in the art could easily conceive.

According to the disclosure of the present invention, the sleep period of the receiving node 23 could be prolonged effectively under the ZigBee standards. In convention, the nodes need to wake from the sleep mode every two seconds, while in the present invention, the sleep period of the nodes could be prolonged to two minutes in a practical application. Moreover, the battery life of the conventional nodes is 70.73 days approximately, while in the present invention, the battery life of the nodes is 250.7 days (183.4 days in the most serious consumptions) under the same conditions. Regarding to packet transmission, there is a limitation in the prior art, that is approximately 3.5 packets per second. In the present invention, 116 packets per second can be achieved in the non-sleep period. Obviously, the present invention provides a wireless network and a packet transmitting method with lower costs and higher efficiencies.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above description, they have substantially been covered in the following claims as appended.

What is claimed is:

1. A packet transmitting method for use in a wireless network, the wireless network following the IEEE 802.15.4 standard and comprising a coordinator, an access node, a receiving node and a transferring node, the transferring node having a packet required to be transmitted to the receiving node, the method comprising:
    (a) determining by the transferring node that the receiving node is in a sleep mode;
    (b) transmitting the packet to the coordinator at a network layer of the IEEE 802.15.4 standard by the transferring node;
    (c) storing a pending flag in the transferring node, wherein the pending flag records the packet waiting to be received by the receiving node; and
    (d) temporarily storing the packet by the coordinator when the coordinator receives the packet having a pending bit as "1";
    wherein when the access node receives the packet having the pending bit as "1", the access node forwards the packet to the coordinator without amending a source address and an objective address recorded in the packet.

2. The method as claimed in claim 1, wherein the step (b) further comprises a step of setting the pending bit as "1" in the packet.

3. The method as claimed in claim 2, wherein the pending bit is one of a plurality of bits in the packet.

4. The method as claimed in claim 1, wherein the wireless network further comprises a sending node, the method further comprising a step of (e) sending the packet to the transferring node by the sending node before the step (a).

5. The method as claimed in claim 1, further comprising a step of (f) after the step (d): sending a request signal to the transferring node by the receiving node when the receiving node wakes from the sleep mode.

6. The method as claimed in claim 5, further comprising a step of (g) after the step (f): determining the existence of the packet by the transferring node in response to the request signal by checking the pending flag.

7. The method as claimed in claim 6, further comprising the following steps after the step (g):
    (h) sending a retrieving command packet to the coordinator by the transferring node when the transferring node determines the packet existing;
    (i) checking the packet in response to the retrieving command packet and transmitting the packet to the receiving node by the coordinator;
    (j) transmitting an ending packet to the receiving node by the coordinator; and
    (k) returning the receiving node to the sleep mode in response to the ending packet.

8. The method as claimed in claim 7, wherein the ending packet is a packet with zero-length.

9. The method as claimed in claim 7, further comprising a step of (l) after the step (j): storing the pending flag by the transferring node wherein the pending flag records no packet waiting to be received by the receiving node.

10. The method as claimed in claim 7, wherein the step (i) uses a manner of FIFO (first-in-first-out) transmission to transmit the packet.

11. The method as claimed in claim 6, further comprising the following steps after the step (g):
   (m) transmitting an ending packet to the receiving node when the transferring node determines that the packet does not exist; and
   (n) returning the receiving node to the sleep mode in response to the ending packet.

12. The method as claimed in claim 11, wherein the ending packet is a packet with zero-length.

13. A power-saving wireless network following the IEEE 802.15.4 standard, comprising:
   a coordinator;
   an access node;
   a receiving node; and
   a transferring node, having a packet required to be transmitted to the receiving node, wherein the transferring node transmits the packet to the coordinator at a network layer of the IEEE 802.15.4 standard and stores a pending flag recording the packet waiting to be received by the receiving node when the transferring node determines the receiving node being in a sleep mode, and the coordinator temporarily stores the packet when the coordinator receives the packet having a pending bit as "1";
   wherein when the access node receives the packet having the pending bit as "1", the access node forwards the packet to the coordinator without amending a source address and an objective address recorded in the packet.

14. The power-saving wireless network as claimed in claim 13, further comprising a sending node for transmitting the packet to the transferring node.

15. The power-saving wireless network as claimed in claim 13, wherein when the coordinator receives a retrieving command packet, the coordinator checks the packet in response to the retrieving command packet and transmits the packet to the receiving node, and subsequently transmits an ending packet with zero-length to the receiving node.

16. The power-saving wireless network as claimed in claim 13, wherein the receiving node transmits a request signal to the transferring node after the receiving node wakes from the sleep mode, and the receiving node returns to the sleep mode after receiving an ending packet with zero-length.

17. The power-saving wireless network as claimed in claim 13, wherein the transferring node determines the existence of the packet in response to the request signal by checking the pending flag, the transferring node transmits a retrieving command packet to the coordinator when the packet exists, and transmits an ending packet with zero-length to the receiving node when the packet does not exist.

18. A computer-readable medium, storing a computer program to perform a packet transmitting method for use in a wireless network, the wireless network following the IEEE 802.15.4 standard and comprising a coordinator, an access node, a receiving node and a transferring node, the transferring node having a packet required to be transmitted to the receiving node, the method comprising:
   (a) determining by the transferring node that the receiving node is in a sleep mode;
   (b) transmitting the packet to the coordinator at a network layer of the IEEE 802.15.4 standard by the transferring node;
   (c) storing a pending flag in the transferring node, wherein the pending flag records the packet waiting to be received by the receiving node; and
   (d) temporarily storing the packet by the coordinator when the coordinator receives the packet having a pending bit as "1";
   wherein when the access node receives the packet having the pending bit as "1", the access node forwards the packet to the coordinator without amending a source address and an objective address recorded in the packet.

19. The computer-readable medium as claimed in claim 18, wherein the wireless network further comprises a sending node, the method further comprising a step of (e) sending the packet to the transferring node by the sending node before the step (a).

20. The computer-readable medium as claimed in claim 18, wherein the method further comprises a step of (f) after the step (d): sending a request signal to the transferring node by the receiving node when the receiving node wakes from the sleep mode.

21. The computer-readable medium as claimed in claim 20, wherein the method further comprises a step of (g) after the step (f): determining the existence of the packet by the transferring node in response to the request signal by checking the pending flag.

22. The computer-readable medium as claimed in claim 21, wherein the method further comprising the following steps after the step (g):
   (h) sending a retrieving command packet to the coordinator by the transferring node when the transferring node determines the packet existing;
   (i) checking the packet in response to the retrieving command packet and transmitting the packet to the receiving node by the coordinator;
   (j) transmitting an ending packet with zero-length to the receiving node by the coordinator; and
   (k) returning the receiving node to the sleep mode in response to the ending packet with zero-length.

23. The computer-readable medium as claimed in claim 22, wherein the method further comprising a step of (l) after the step (j): storing the pending flag by the transferring node wherein the pending flag records no packet waiting to be received by the receiving node.

24. The computer-readable medium as claimed in claim 22, wherein the step (i) of the method uses a manner of FIFO (first-in-first-out) transmission to transmit the packet.

25. The computer-readable medium as claimed in claim 21, wherein the method further comprising the following steps after the step (g):
   (m) transmitting an ending packet with zero-length to the receiving node when the transferring node determines the packet does not exist; and
   (n) returning the receiving node to the sleep mode in response to the ending packet with zero-length.

* * * * *